US005199984A

United States Patent [19]

Jeong

[11] Patent Number: 5,199,984

[45] Date of Patent: Apr. 6, 1993

[54] BLACK MATRIX COMPOSITION FOR USE IN COLOR CATHODE RAY TUBE

[75] Inventor: Sumin Jeong, Kyunggi, Rep. of Korea

[73] Assignee: Samsung Electron Devices Co., Ltd., Kyunggi, Rep. of Korea

[21] Appl. No.: 782,404

[22] Filed: Oct. 25, 1991

[30] Foreign Application Priority Data

Oct. 31, 1990 [KR] Rep. of Korea .................... 90-17608

[51] Int. Cl.[5] .................................................. C09C 1/44

[52] U.S. Cl. .................................... 106/474; 106/459; 106/480; 313/466

[58] Field of Search ................ 313/466; 106/456, 459, 106/472, 474, 480; 252/582

[56] References Cited

U.S. PATENT DOCUMENTS 4,990,824 2/1991 Vriens et al. ........................ 313/474

FOREIGN PATENT DOCUMENTS 59-215635 12/1984 Japan .

*Primary Examiner*—Mark L. Bell

*Assistant Examiner*—Chris Gallo

*Attorney, Agent, or Firm*—Christie, Parker & Hale

[57] ABSTRACT

The present invention provides a black matrix composition that improves the contrast and the color purity at the same time. The black matrix composition comprising colloidal graphite as a major component, and ferric oxide ($Fe_2O_3$), cobalt aluminate($CoOxAl_2O_3$), or mixture thereof, at a certain ratio as a pigment. The iron and surfactant are added as a cohesive. The above mixed pigment absorbs the red and blue light so as to improve the contrast and the color purity. The iron partial having magnetism can strengthen the cohesion so as to form the preferable deposited thickness of the black matrix composition.

7 Claims, No Drawings

BLACK MATRIX COMPOSITION FOR USE IN COLOR CATHODE RAY TUBE

FIELD OF THE INVENTION

The present invention relates to a black matrix composition which can be used as a black matrix deposited among phosphors, and specially to a black matrix composition comprising graphite and pigment(s that improves the contrast and the color purity of a screen of a color picture tube.

BACKGROUND OF THE INVENTION

A color picture is formed such that electron beams emitted from an electron gun strike phosphors deposited as stripes or dots on the fluorescent layer of a color picture tube. In this process, the conventional method provides that a black matrix is deposited among a color pattern in order to minimize reduction in color purity caused by electron beams' mislanding on corresponding phosphors.

Conventionally, a composition has been used as a composition for use in the black matrix, comprising graphite, surfactant, water and the other additives.

However, the black matrix maded of the above composition does not have the advantage of improving the contrast of the picture, since it cannot filter the internal light, especially a blue light with wave length of 450 nm and a red light with wave length of 620 nm occurring inside when the electron beams strike the phosphors and lowers the contrast.

In order to solve this problem, Japanese specification No. 84-215635 proposes that a blue refractive layer be deposited on blue phosphors and that this layer plays a part in a filter absorbing the internal light of the phosphors. However, this method lowers the color purity, and the complex fabricating process required results in bad productivity.

SUMMARY OF THE INVENTION

According to the present invention, there is provided a black matrix with a material absorbing a major peak wave length of a phosphor added to the graphite composition, whereby the contrast and the color purity are improved at the same time.

To achieve this feature, the present invention proposes a black matrix composition comprising colloidal graphite, ferric oxide ($Fe_2O_3$), cobalt aluminate ($CoOx\text{-}Al_2O_3$), or mixture thereof as a pigment which can absorb an internal and external light of a major peak wave length of the phosphor, wherein iron particles and a surfactant may be added as a cohesive.

DETAILED DESCRIPTION OF THE PREFERRED EMBODIMENT

A black matrix composition according to the present invention preferably comprises 0.8–5 weight percentage of a graphite, 0.1–1 weight percentage of iron, 1.7–4.2 weight percentage of a pigment, 0.1–0.5 weight percentage of a surfactant, and a remaining water.

In a composition according to the present invention, ferric oxide or cobalt aluminate or mixture thereof is used as a pigment. Where this mixture is used, the ratio of ferric oxide to cobalt aluminate is preferably 1 to 1.

The ferric oxide or the cobalt aluminate or the mixture thereof used in the present invention can filter a blue light with wavelength of 450 nm and a red light with wavelength of 650 nm, so that it is possible to improve the color purity and the contrast.

The black matrix composition according to the present invention allows a black matrix having a comparative thick layer to be used because when the iron in the above composition being is mixed with the other materials, it can improve the magnetism of the composition due to that of the iron, so that the composition has a high cohesion.

Further, the thickness of layer can be controlled according to the amount of iron. In a composition according to the present invention, Fe particles with particle size up to 1 μm are preferably used and any surfactant used conventionally in or with the black matrix composition can be used.

The detailed description of the present invention will be apparent in the following in connection with the preferred embodiment. However, the invention should not be restricted to this embodiment.

EXAMPLE

In a ball mill are put a colloidal graphite with iron having particle size up to 1 μm, pigment, surfactant (TRION CF54 manufactured by Rohm and Hass) and water. They are sufficiently milled during 12 hours to be made into the slurry, which constitutes 5 weight percentage of a black matrix, and then it is deposited in a predetermined thickness on a test piece(s). After that, the refractive ratio of the layer is measured by the MCPD method. In the practice of this invention, the kinds of pigment contained in the black matrix composition deposited on each test pieces and the mixed ratio of graphite to pigment are as shown in Table 1.

In one case, the mixed ratio of graphite to pigment is 1 to 1, the graphite with particle size up to 1 μm is 2.5 weight percentage, the iron with particle size up to 1 μm is 1 weight percentage, the pigment is 2.5 weight percentage, the surfactant is 0.5 weight percentage and the water is remainder.

In the practice of this invention, the ball used in milling the above composed materials can be the glass-made-ball with diameter of 5–6 mm.

TABLE

| Test Piece No. | Mixed Ratio Graphite | Ferric Oxide | Cobalt Aluminate | Refractive Ratio (%) |
|---|---|---|---|---|
| 1 | 2.5 | 2.5 | — | 12 |
| 2 | 2.5 | — | 2.5 | 10 |
| 3 | 2.5 | 1.25 | 1.25 | 5 |
| 4 | 1.7 | 3.3 | — | 7 |
| 5 | 1.7 | — | 3.3 | 6 |
| 6 | 1.7 | 1.7 | 1.7 | 5 |
| 7 | 1.25 | 3.75 | — | 5 |
| 8 | 1.25 | — | 3.75 | 3 |
| 9 | 1.2 | 1.9 | 1.9 | 4 |
| 10 | 1 | 4 | — | 3 |
| 11 | 1 | — | 4 | 3 |
| 12 | 1 | 2 | 2 | 4 |
| 13 | 0.8 | 4.2 | — | 3 |
| 14 | 0.8 | — | 4.2 | 3 |
| 15 | 0.8 | 2.1 | 2.1 | 3 |
| 16 | — | 5 | — | 21 |
| 17 | — | — | 5 | 15 |
| 18 | — | 2.5 | 2.5 | 5 |
| 19 | 5 | — | — | 3 |

*The total concentration of graphite in the black matrix composition is 5 weight percentage. Iron particles is added by the amount of 1 weight percentage.

As shown in the above table, where the mixed ratio of graphite and pigment is 1 to 1, the refractive ratio becomes somewhat high, and the red and blue light can be selectively filtered. The pigment obtained by mixing a ferric oxide and a cobalt aluminate shows the homogeneous and stable low refractive ratio and has the advantage of improving the contrast of the picture since the blue and red light can be absorbed at the same time.

In case of using the graphite and the mixed pigment, the test piece 15 shows the lowest refractive ratio, so that if using the mixed pigment the mixed ratio of graphite and the mixed pigment is preferably 1 to 5. According to this invention, the pigment absorbing the light having the same wavelength as the major peak wave length of the phosphor is added to the conventional black material, so that it prevents an interferenced light lowering the contrast to improve the color purity. The iron particle is added, so that when forming the black matrix, the layer can be comparatively thick due to the magnetism of the iron.

What is claimed is:

1. A black matrix composition for use in a color cathode ray tube comprising a colloidal graphite as a major component, which comprises 0.8–5 weight percentage of graphite, 0.1–1 weight percentage of iron, 1.7–4.2 weight percentage of pigment, 0.1–0.5 weight percentage of surfactant and remaining water.

2. The black matrix composition as claimed in claim 1, wherein the pigment comprises at least one of ferric oxide, cobalt aluminate, and mixtures thereof.

3. The black matrix composition as claimed in claim 1, wherein the particle size of graphite is up to 1 μm.

4. The black matrix composition as claimed in claim 1, wherein the particle size of iron is up to 1 μm.

5. A black matrix composition for use in a color cathode ray tube comprising a colloidal graphite as a major component, which comprises 0.8–5 weight percentage of graphite, 0.1–1 weight percentage of iron, 1.7–4.2 weight percentage of ferric oxide ($Fe_2O_3$) and 1.7–4.2 weight percentage of cobalt aluminate ($CoO\chi Al_2O_3$) as mixed pigment, 0.1–0.5 weight percentage of surfactant and remaining water.

6. The black matrix composition as claimed in claim 5, wherein the particle size of graphite is up to 1 μm.

7. The black matrix composition as claimed in claim 5, wherein the particle size of Fe is up to 1 μm.

* * * * *